United States Patent [19]
Martin et al.

[11] Patent Number: 6,098,365
[45] Date of Patent: Aug. 8, 2000

[54] RADIUS TONGUE AND GROOVE PROFILE

[75] Inventors: Michael L. Martin; Eugene E. Zellner, both of Tacoma, Wash.

[73] Assignee: APA - The Engineered Wood Association, Tacoma, Wash.

[21] Appl. No.: 09/196,640

[22] Filed: Nov. 19, 1998

[51] Int. Cl.[7] ............................... E04B 1/38; E04F 15/04
[52] U.S. Cl. ................. 52/592.1; 52/592.4; 52/589.1; 52/539; 52/390; 403/334; 403/381; 403/345
[58] Field of Search ................. 52/592.4, 592.1, 52/389.1, 339, 390, 392; 403/333, 334, 345, 559.6, 375, 381

[56] References Cited

U.S. PATENT DOCUMENTS

| | | | |
|---|---|---|---|
| 643,552 | 2/1900 | Squires | 403/381 |
| 2,267,330 | 12/1941 | Goss . | |
| 2,823,433 | 2/1958 | Kendall . | |
| 2,839,790 | 6/1958 | Collings . | |
| 4,695,502 | 9/1987 | Rush | 428/192 |
| 4,807,416 | 2/1989 | Parasin . | |
| 5,165,816 | 11/1992 | Parasin . | |

FOREIGN PATENT DOCUMENTS 914370  11/1972  Canada .

*Primary Examiner*—Robert Canfield
*Attorney, Agent, or Firm*—Arent Fox Kintner Plotkin & Kahn PLLC

[57] ABSTRACT

A tongue and groove profile for a construction panel wherein the tongue protrudes and extends outwardly from a first edge of the panel and has a chamfered head. The head expands from the chamfered edge to a neck and merges into a shoulder portion. The shoulder portion of the tongue has two radiused convex sides which intersect and merge with the first edge of the panel. A groove is formed in a second edge of the panel and extends inwardly into the second edge forming a cavity. The groove has a chamfered head which expands into a neck which then expands into a wider shoulder portion which has two radiused concave sides which expand outwardly to form an opening in the second edge of a panel. The tongue of one construction panel can fit in interlocking relationship into a groove of a second panel to form a joint between the two panels.

5 Claims, 2 Drawing Sheets

RADIUS TONGUE AND GROOVE PROFILE

BACKGROUND OF THE INVENTION

The invention relates to a novel tongue and groove profile for use in joining wood-based boards or panels comprised of plywood, oriented strand board (OSB), waferboard, particleboard, fiberboard or other similar wood based materials.

The use of tongue and groove profiles for joining panels or boards for construction of floors, roofs and other building structural features is well known. Tongue and groove profiles allow two boards or panels to be interlockingly joined during construction. In construction of a building structure, the panels span the distance between supporting joists with the interlocking tongue and groove side edges of adjacent panels serving to support the panels against deflection between the joists while the end edges of the panels are located over and supported by the joists.

Prior tongue and groove profiles in use have experienced several problems, however. A prior tongue and groove profile design (see FIG. 1) was constructed such that the inner walls of the groove were essentially parallel with the exception of the innermost region of the groove adjacent to the base of the groove where the groove is narrowed to accommodate the tongue tip. The opening or clearance of the groove is only slightly larger than the thickness of the tip of the tongue. This results in some difficulty of insertion of the tongue into the groove during the installation process. Installation can be especially difficult if panels are bowed, or the edges of the panels are deformed or swollen due to an increased water content in the panels. To avoid such problems, a tongue and groove structure comprised of a tongue that is slightly longer in length than the length of the groove and in which a notch is cut through the tongue has been used. The notches are intended to enable water to drain out. To ensure that the notches are not closed off by edge-to-edge contact of mated panels, the tongue is made longer than the groove. Without the notches, water could accumulate on top of the panels thereby increasing the risk of swelling or buckling of the panels, which are undesirable conditions. Edge sealers can be applied to the edges of panels to inhibit the swelling of panels caused by moisture. However, prior tongue and groove designs were difficult to adequately seal in this manner due to the narrow opening of the mouth of the groove and the direction of the sealant being essentially parallel to the machined surfaces of the tongue and groove.

Another disadvantage of prior tongue and groove profiles was that markings were necessary on the panels because the panels had to be oriented with a particular surface facing up or down to enable a satisfactory interlocking joint with the adjacent panel.

Additionally, when adhesive was desired for a secure fit of two joined panels, prior tongue and groove profiles were prone to overfilling with adhesive because there was not a properly designed gap between the tongue and groove when interfit and excess adhesive could squeeze out onto the surfaces of the panels creating a messy, undesirable condition.

Accordingly, there is a need for a tongue and groove profile which is of a configuration enabling a close interlocking mating relationship between two construction panels and which enables a large load transfer capacity and which can be used in multiple applications in construction, but yet is not subject to severe deformation if the panels are exposed to moisture.

SUMMARY OF THE INVENTION

It is, accordingly, an object of the present invention to provide a tongue and groove profile of a configuration which enables two panels to be easily fit together and enables a close interlocking mating relationship between two construction panels.

It is a further object of the present invention to provide a tongue and groove profile which provides a high strength joint having a large load transfer capacity such that the profile is capable of use in multiple construction applications such as for flooring, roofing and other applications.

It is a further object of the present invention to provide a tongue and groove profile of a configuration which does not require that the panels be oriented with a particular surface facing up or down to achieve a satisfactory interlocking joint between panels.

It is an additional object of the present invention to provide a tongue and groove profile to which adhesive can be applied without resultant squeeze out of excess adhesive when two panels are interconnected.

It is still a further object of the present invention to provide a tongue and groove profile to which sealant can be evenly applied to assure adequate sealing of all surfaces of the tongue and groove edges.

Additional objects and advantages of the invention will be set forth in the description which follows or may be learned by practice of the invention.

To achieve the foregoing objects, and in accordance with the purpose of the invention as embodied and broadly described herein, there is provided a tongue and groove profile for a construction panel comprising a tongue, formed on a first edge of the construction panel and protruding and extending outwardly from the first edge, the tongue including a head having a chamfered edge; a neck having two essentially parallel sides, wherein the head expands from the chamfered edge to the neck and merges into a shoulder portion, the shoulder portion having two radiused convex sides, the two radiused convex sides intersecting and merging with the first edge of the construction panel at a first end and the neck merging with the shoulder portion at a second end; and a groove, formed on a second edge of the construction panel and extending inwardly into the second edge in a manner forming a cavity, the groove including a head having a chamfered edge; a neck having two essentially parallel sides wherein the head expands into the neck; a shoulder portion having two radiused concave sides, the two radiused concave sides expanding outwardly to form an opening in the second edge of the construction panel at a first end of the shoulder portion and the neck merging with the shoulder portion at a second end of the shoulder portion; wherein the tongue of a first construction panel and a groove of a second construction panel having the same configuration as the first construction panel fit together in interlocking relationship such that the neck of the tongue fits into the neck of the groove and the head and shoulder portion of the tongue fit into the head and shoulder portion of the groove to form a joint between the first and second construction panels.

The accompanying drawings, which are incorporated in and constitute part of this specification, illustrate one embodiment of the invention and, together with the description, serve to explain the principles of the invention.

DESCRIPTION OF THE PREFERRED EMBODIMENT

Figure 1A:
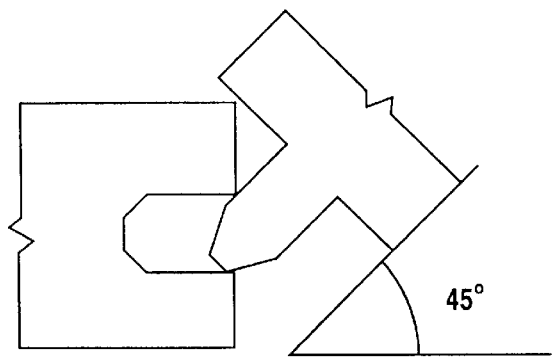
FIGS. 1A–1D illustrate a prior tongue and groove profile in varying stages of assembly.

Reference will now be made in detail to the present preferred embodiment of the invention, an example of which is illustrated in the accompanying drawings in which like reference numerals refer to corresponding elements.

The preferred embodiment of the tongue and groove profile of the present invention is illustrated in FIGS. 2A–2D. Referring to FIGS. 2A–2D, there are shown two construction panels 10 and 20. Each panel 10 and 20 has a tongue 15 on a first edge and a groove 25 on a second edge. The two construction panels 10 and 20 are similar in all respects. The two construction panels 10 and 20 may be comprised of any suitable wood based composition, including for example, plywood, oriented strand board (OSB), waferboard, particleboard or fiberboard. Construction panels having panel thicknesses in the range of $19/32$ to $7/8$ inch are preferred.

Tongue 15 protrudes and extends outwardly from the first edge of panel 10. Tongue 15 includes head 16 which has a chamfered edge. Tongue 15 further includes a neck 17 which has two essentially parallel sides. The head 16 expands from the chamfered edge to the neck 17 and merges into a shoulder portion 18. Shoulder portion 18 has two radiused convex sides which intersect and merge with the first edge of panel 10 at a first end of shoulder portion 18 and neck 17 merges into shoulder portion 18 at a second end of shoulder portion 18.

Groove 25 of panel 20 extends inwardly into the second edge of panel 20 and is shaped to form a cavity which corresponds to the shape of tongue 15. Panel 10 has a groove on its second edge which matches groove 25, and panel 20 has a tongue on its opposite edge which matches tongue 15. Groove 25 is formed with a head 27 which has a chamfered edge. Head 27 expands into a neck 28 which has two essentially parallel sides that merge into a shoulder portion 29. The shoulder portion 29 has two radiused concave sides which expand to form an opening in the second edge of construction panel 20.

Figure 1B:
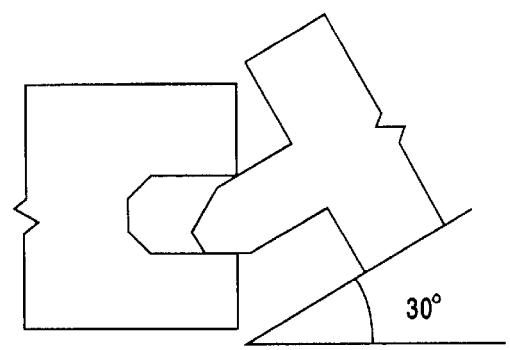
Figure 1C:
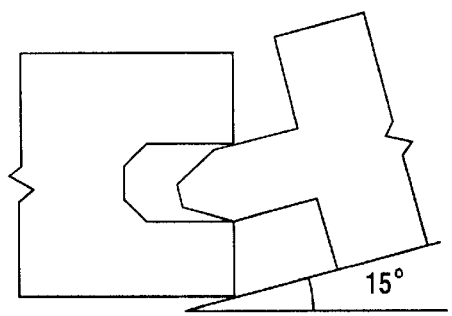
Figure 1D:
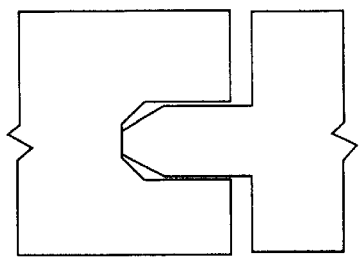
Figure 2A:
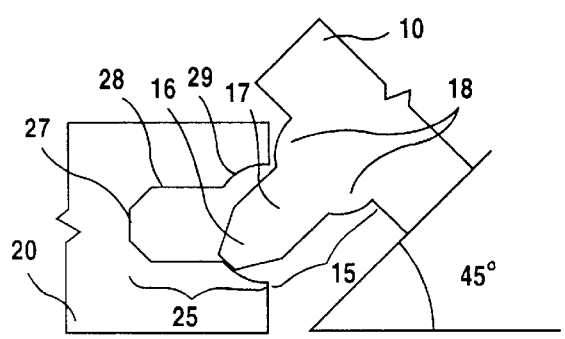
FIG. 2A–2D illustrate two construction panels, both of which have the tongue and groove profile of the present invention. One panel is shown with the side edge which includes the tongue and the second panel is shown with the side edge which includes the groove. The drawings show varying stages of assembly.
Figure 2B:
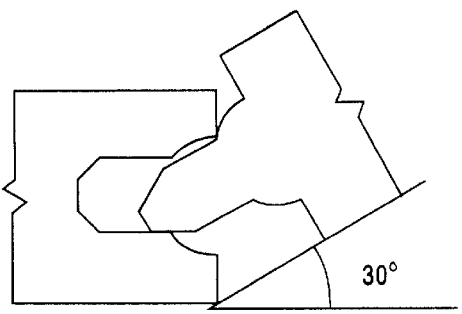
Figure 2C:
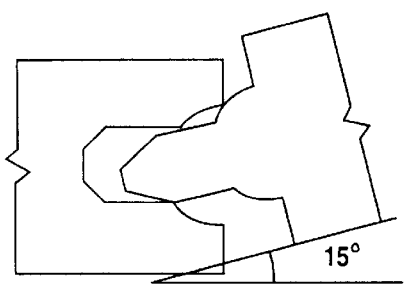

As illustrated in FIGS. 2A–2C, the tongue 15 can interlock and easily fit into groove 25 regardless of the angle of rotation of tongue 15 into groove 25, in comparison to prior tongue and groove profiles, as illustrated in FIGS. 1A–1C.

Figure 2D:
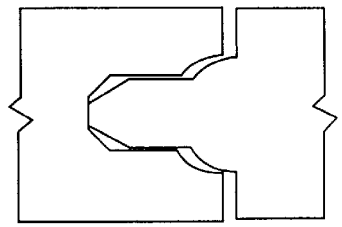

FIG. 2D illustrates panels 10 and 20 in an assembled state. Tongue 15 and groove 25 fit together in interlocking relationship so that neck 17 of tongue 15 fits into neck 28 of groove 25 and the head 16 and shoulder portion 18 of tongue 15 fit into the head 27 and shoulder portion 29 of groove 25 to form a joint between panels 10 and 20. The inwardly curving sides of shoulder portion 29 ensure that the head 16 of tongue 15 is aligned with the neck 28 of groove 25. This design enables easy penetration of head 16 into shoulder portion 29 and the neck 17 into neck 28 even when panels 10 and 20 are swollen, bowed or slightly damaged from excess moisture or from other causes.

In an assembled joint of panels 10 and 20, the adjacent essentially parallel sides of neck 17 of tongue 15 and neck 28 of groove 25 cooperate to act as load-bearing surfaces to prevent undesirable movement or deflection on one panel edge with respect to the engaged adjacent panel edge.

The tongues and grooves are formed along the longer edges of adjacent construction panels and are used to interlock two panels together and serve to transfer the load from one panel to another panel thereby increasing the edge stiffness of the overall system while lowering the overall deflection of the edges of the panels and preventing excessive deflection of one panel edge with respect to an adjacent interlocked panel edge.

When assembling joints formed of two construction panels, such as panels 10 and 20, adhesive may be applied to the interior of groove 25 (optional). The spaces between head 16 and head 27 and between shoulder portions 18 and 29 define gaps to accommodate excess adhesive. The second space between shoulder portions 18 and 29 can capture any excess adhesive which extrudes past the space between heads 16 and 27, thereby assuring a strong bond within the joint while reducing the risk that excess adhesive will be squeezed out at the panel face causing undesirable messiness, such as existed with prior designs of tongue and groove profiles. Alternatively, if adhesive is not applied, the spaces will accommodate any debris or dirt which may be pushed forward when tongue 15 penetrates groove 25. The spaces also accommodate still further expansion and contraction in a joint formed when two panels are assembled.

The radiused profile of tongue and groove design of the present invention is also more suitable for enabling even dispersement of edge sealant than prior designs as it permits dispersement of sealant over all surfaces of the edges of the tongues and grooves.

The shape and location of tongues and grooves on construction panels, such as panels 10 and 20, may be made symmetrical such that any single panel could be inverted or oriented with either surface facing up or down, but still enabling a satisfactory interlocking joint with any adjacent panel, in contrast to prior tongue and groove designs.

It should be apparent to those skilled in the art that various modifications and variations may be made to the tongue and groove profile of the present invention without departing from the scope or spirit of the invention. Thus, it is intended that the invention cover such modifications and variations of the invention, provided they come within the scope of the appended claims and their equivalents.

What we claim is:

1. A construction panel, said construction panel comprising:

a panel member;

a tongue formed on a first edge of the panel member and protruding and extending outwardly from the first edge, the tongue including a head having a chamfered edge;

a neck having two essentially parallel sides, wherein the head expands from the chamfered edge to the neck and merges into a shoulder portion, the shoulder portion having two radiused convex sides, the two radiused convex sides intersecting and merging with the first edge of the panel member at a first end and the neck merging with the shoulder portion at a second end; and a groove, formed on a second edge of the panel member and extending inwardly into the second edge in a manner forming a cavity, the groove including a head having a chamfered edge;

a neck having two essentially parallel sides, wherein the head expands from the neck;

a shoulder portion having two radiused concave sides, the two radiused concave sides expanding outwardly to form an opening in the second edge of the construction panel at a first end of the shoulder portion and the neck merging with the shoulder portion at a second end of the shoulder portion;

wherein the tongue of the panel member is configured to fit together with an adjacent groove of an adjacent matching panel member in interlocking relationship such that the neck of the tongue is configured to fit into the neck of the adjacent groove and the head and shoulder portion of the tongue fit into a head and shoulder portion of the adjacent groove to form a joint between the first and second construction panels.

2. The construction panel as claimed in claim 1 wherein the head of the tongue is narrower in width than the opening in the second edge.

3. The construction panel as claimed in claim 1 wherein a gap is formed between the shoulder portion of the tongue and the shoulder portion of the groove when the tongue and the groove are fit together.

4. The construction panel as claimed in claim 3 wherein the gap is configured to accommodate adhesive.

5. A construction panel system utilizing a tongue and groove profile, said construction panel system comprising:

a plurality of interlocking panel members, each panel member comprising a tongue formed on a first edge of the panel member and protruding and extending outwardly from the first edge, the tongue including a head having a chamfered edge;

a neck having two essentially parallel sides, wherein the head expands from the chamfered edge to the neck and merges into a shoulder portion, the shoulder portion having two radiused convex sides, the two radiused convex sides intersecting and merging with the first edge of the panel member at a first end and the neck merging with the shoulder portion at a second end; and a groove, formed on a second edge of the panel member and extending inwardly into the second edge in a manner forming a cavity, the groove including a head having a chamfered edge;

a neck having two essentially parallel sides, wherein the head expands from the neck;

a shoulder portion having two radiused concave sides, the two radiused concave sides expanding outwardly to form an opening in the second edge of the construction panel at a first end of the shoulder portion and the neck merging with the shoulder portion at a second end of the shoulder portion;

wherein a tongue of a first panel member and a groove of a second, adjacent matching panel member fit together in an interlocking relationship such that a neck of the tongue of the first panel member fits into a neck of the groove of the second panel member and a head and a shoulder portion of the tongue of the first panel member fits into a head and shoulder portion of the groove of the adjacent panel member to form a joint between the first and second panel members.

* * * * *